8120X
J. Bouis.
Hot-Air Furnace.
Patented Mar. 29, 1834.
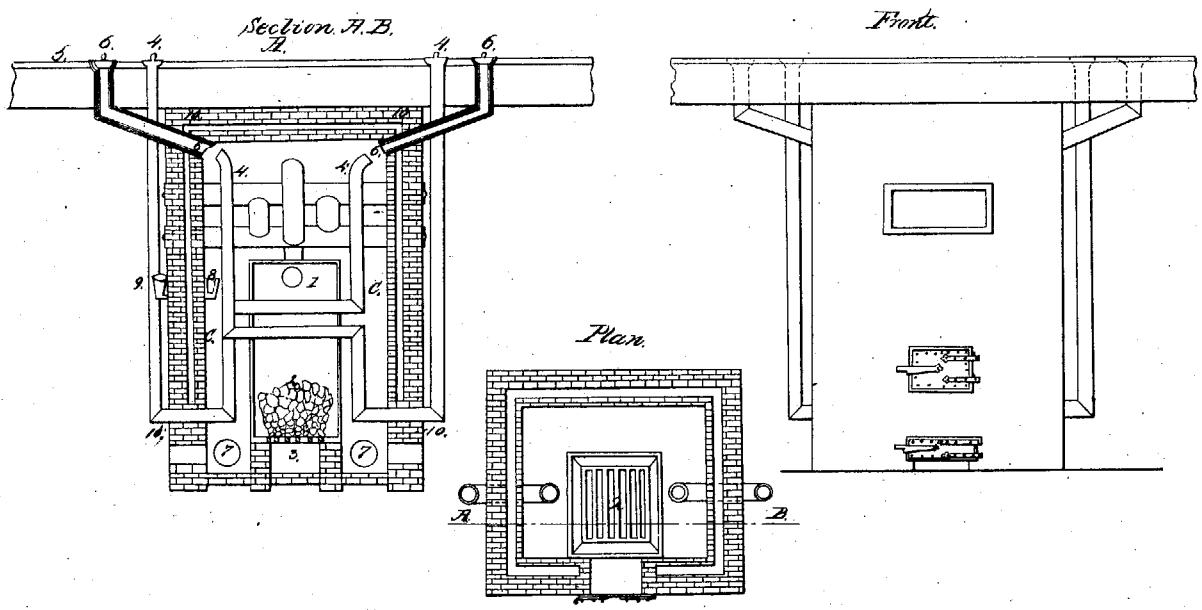
THE NORRIS PETERS CO., WASHINGTON, D. C.

John Bouis Baltimore Maryland

Letters Patent

The Schedule referred to in these Letters Patent and making part of the same Con-
taining a description in the words of the said John Bouis himself of his
improvement being a hot air furnace or apparatus for warming rooms with
rarefied or heated air and expelling the cold air which in turn is also
heated....

Be it known that I John Bouis of the City & County of Baltimore
and State of Maryland have made an improvement in the useful arts
being a hot air furnace or apparatus for warming rooms with rarefied or
heated air and expelling the cold air which in turn is also heated described
as follows reference being had to the annexed drawings A represents the entire apparatus of which No 1 is the receiver 2 the furnace
or grate in which the anthracite or Stone Coal may be used and 3 is an
opening or draft flue to cause a speedy and continued combustion
the [illegible] 3 is for the purpose of cleaning the grate when [illegible]. From the
back of the upper part of the receiver No 1 a pipe projects with an Elbow
leading up to and communicating with the horizontal connected pipes B
into which the smoke is discharged passing from one to the other until its
heat is exhausted thence descending to the receiver by an additional pipe
is discharged into the chimney.

10.10.10.10. is a double wall of brick within
which the apparatus is erected or placed the outer one being 4½ inches
the inner one 2½ inches thick; with a space between them of 2 inches filled in
with pulverized charcoal to act as a non conductor both of heat and
cold Within the receiver No 1 there are horizontal pipes equal in
number to the apartments which may be desired to be warmed. These pipes
are heated as well from the fire of the grate as by the hot air confined
within the receiver 4.4. are pipes that receive the cold air from the
apartments intended to be heated of which the line 5.5. is the floor Through
these pipes the cold air (being much heavier than the hot air) descends to a level with the bed of the grate 2. passing thro' the wall 11 and Conti-
-nuing towards the grate the air becomes rarefied ascends again by a con-
-tinuation of the pipe to a level with the lower part of the receiver 1 and
beyond of the reach of the flame from the grate passing thro' the receiver
and then the pipe being farther extended by an elbow upwards the hot
air passing through it is conveyed to the pipes the 6. which lead to and
supply the apartments therewith These latter pipes 6. are so constructed
being a smaller within a larger one, having a space between them
filled in with pulverised Charcoal, renders them not only impervious
to the external air but prevents any heat escaping from them otherwise
their utility would be rendered in a great measure abortive. 77 are
valves to admit the atmosphere or cold air from without, or rather
the circulating air of the apartment where the apparatus is con-
-structed, which passing into the Chamber C assists in propelling
the rarefied air that has been generated there up to the Conducting
pipes 6. Thus as pipe 6 discharges its rarefied or hot air into the
apartment it being lighter than the cold air rises above and forces
the cold air into the pipes 4. This in descending becomes rarefied
and rises again when as before noted it is discharged into the con-
-ducting pipe 6. 8 is a reservoir of a capacity suited to the size
& dimensions of the apparatus which is kept filled with water within
the Chamber C by means of a funnel 9 and is intended by the steam
or vapour produced from it which rising and mixing with the rarefied
air passes with it through the pipes 6 into the apartments thereby preven-
-ting too great a rarefication of the hot air and reduces it as near as poss-
-ible to the elasticity of atmospheric air.

The whole apparatus may be put up in
the cellar or basement story of a house, from which the hot or cold air
pipes may be carried or extended to any apartment whether
in the first, second or third floors, passing within the walls or [illegible]
-ed by casings. Should an apartment become too much heated it
can be promptly remedied by closing the valve at the upper end
of the pipe 6. (The invention here claimed and desired to be secured by Letters Patent consists in the combination arrangement and adaptation of the several parts of the before described apparatus for warming rooms: particularly the double walled chamber containing the pulverised Char Coal which encloses the apparatus and serves as a non conductor for warm or Cold air. the receiver with the pipes Conne=cted with it the Continuous pipes that receive the Cold air from the apartments to be heated, the double pipes with pulverised Charcoal, and the reservoir for Containing water for tempering the heated air. And it is here declared that the subscriber does not mean to confine himself to the particular dimensions of the parts and number of pipes used, as herein set forth but intends to vary these according to circumstances and the situation in which the apparatus is to be erected)

Witnesses Wm S Elliot
James W. Scott

John Bowes

Drawing 962 words]

Exd
HKC